(12) United States Patent
Deninger et al.

(10) Patent No.: US 8,463,800 B2
(45) Date of Patent: *Jun. 11, 2013

(54) ATTRIBUTES OF CAPTURED OBJECTS IN A CAPTURE SYSTEM

(75) Inventors: William Deninger, San Jose, CA (US); Erik de la Iglesia, Mountain View, CA (US)

(73) Assignee: McAfee, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/431,678

(22) Filed: Mar. 27, 2012

(65) Prior Publication Data

US 2012/0191722 A1 Jul. 26, 2012

Related U.S. Application Data

(60) Continuation of application No. 12/751,876, filed on Mar. 31, 2010, now Pat. No. 8,176,049, which is a division of application No. 11/254,436, filed on Oct. 19, 2005, now Pat. No. 7,730,011.

(51) Int. Cl.
*G06F 17/30* (2006.01)
*G06F 17/00* (2006.01)

(52) U.S. Cl.
USPC .......... 707/755; 707/736; 709/223; 709/224; 706/47; 706/48

(58) Field of Classification Search
USPC ............ 707/736, 755; 709/223, 224; 706/47, 706/48
See application file for complete search history.

(56) References Cited

U.S. PATENT DOCUMENTS

| 4,286,255 A | 8/1981 | Siy |
| 4,710,957 A | 12/1987 | Bocci et al. |
| 5,249,289 A | 9/1993 | Thamm et al. |
| 5,465,299 A | 11/1995 | Matsumoto et al. |

(Continued)

FOREIGN PATENT DOCUMENTS

| EP | 2499806 | 9/2012 |
| WO | WO 2004/008310 | 1/2004 |
| WO | WO 2012/060892 | 5/2012 |

OTHER PUBLICATIONS

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.

(Continued)

*Primary Examiner* — Yicun Wu
(74) *Attorney, Agent, or Firm* — Patent Capital Group

(57) ABSTRACT

Regular expressions used for searching for patterns in captured objects can be grouped into attributes. Such attributes can be associated with captured objects using tags stored in a database. In one embodiment, the present invention includes capturing an object being transmitted over a network, and determining that a regular expression appears in the object, the regular expression belonging to a group of one or more regular expressions associated with an attribute. If a regular expression associated with the attribute is found in the object, then an attribute field of a tag containing metadata related to the captured object is set to indicate the presence of the attribute in the captured object. The presence of the attribute in the captured object can now be determined from the tag, which can be stored in a database.

20 Claims, 10 Drawing Sheets

U.S. PATENT DOCUMENTS

| | | | |
|---|---|---|---|
| 5,479,654 A | 12/1995 | Squibb |
| 5,497,489 A | 3/1996 | Menne |
| 5,542,090 A | 7/1996 | Henderson et al. |
| 5,557,747 A | 9/1996 | Rogers et al. |
| 5,623,652 A | 4/1997 | Vora et al. |
| 5,768,578 A | 6/1998 | Kirk |
| 5,781,629 A | 7/1998 | Haber et al. |
| 5,794,052 A | 8/1998 | Harding |
| 5,813,009 A | 9/1998 | Johnson et al. |
| 5,873,081 A | 2/1999 | Harel |
| 5,937,422 A | 8/1999 | Nelson et al. |
| 5,943,670 A | 8/1999 | Prager |
| 5,987,610 A | 11/1999 | Franczek et al. |
| 5,995,111 A | 11/1999 | Morioka et al. |
| 6,026,411 A | 2/2000 | Delp |
| 6,073,142 A | 6/2000 | Geiger et al. |
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir |
| 6,161,102 A | 12/2000 | Yanagilhara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bharat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,584,458 B1 | 6/2003 | Millett et al. |
| 6,598,033 B2 | 7/2003 | Ross et al. |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,130,587 B2 | 10/2006 | Hikokubo et al. |
| 7,158,983 B2 | 1/2007 | Willse et al. |
| 7,185,073 B1 | 2/2007 | Gai et al. |
| 7,185,192 B1 | 2/2007 | Kahn |
| 7,194,483 B1 | 3/2007 | Mohan et al. |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,070 B2 | 11/2007 | Sweeney et al. |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,657,104 B2 | 2/2010 | Deninger et al. |
| 7,664,083 B1 | 2/2010 | Cermak et al. |
| 7,685,254 B2 | 3/2010 | Pandya |
| 7,689,614 B2 | 3/2010 | de la Iglesia et al. |
| 7,730,011 B1 | 6/2010 | Deninger et al. |
| 7,739,080 B1 | 6/2010 | Beck et al. |
| 7,760,730 B2 | 7/2010 | Goldschmidt et al. |
| 7,760,769 B1 | 7/2010 | Lovett et al. |
| 7,774,604 B2 | 8/2010 | Lowe et al. |
| 7,814,327 B2 | 10/2010 | Ahuja et al. |
| 7,818,326 B2 | 10/2010 | Deninger et al. |
| 7,844,582 B1 | 11/2010 | Arbilla et al. |
| 7,899,828 B2 | 3/2011 | de la Iglesia et al. |
| 7,907,608 B2 | 3/2011 | Liu et al. |
| 7,921,072 B2 | 4/2011 | Bohannon et al. |
| 7,930,540 B2 | 4/2011 | Ahuja et al. |
| 7,949,849 B2 | 5/2011 | Lowe et al. |
| 7,958,227 B2 | 6/2011 | Ahuja et al. |
| 7,962,591 B2 | 6/2011 | Deninger et al. |
| 7,984,175 B2 | 7/2011 | de la Iglesia et al. |
| 7,996,373 B1 | 8/2011 | Zoppas et al. |
| 8,005,863 B2 | 8/2011 | de la Iglesia et al. |
| 8,010,689 B2 | 8/2011 | Deninger et al. |
| 8,055,601 B2 * | 11/2011 | Pandya ............................ 706/47 |
| 8,166,307 B2 | 4/2012 | Ahuja et al. |
| 8,176,049 B2 | 5/2012 | Deninger et al. |
| 8,200,026 B2 | 6/2012 | Deninger et al. |
| 8,205,242 B2 | 6/2012 | Liu et al. |
| 8,271,794 B2 | 9/2012 | Lowe et al. |
| 8,301,635 B2 | 10/2012 | de la Iglesia et al. |
| 8,307,007 B2 | 11/2012 | de la Iglesia et al. |
| 8,307,206 B2 | 11/2012 | Ahuja et al. |
| 2001/0013024 A1 | 8/2001 | Takahashi et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0032772 A1 | 3/2002 | Olstad et al. |
| 2002/0052896 A1 | 5/2002 | Streit et al. |
| 2002/0065956 A1 | 5/2002 | Yagawa et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |

| | | | | | |
|---|---|---|---|---|---|
| 2002/0116124 A1 | 8/2002 | Garin et al. | 2005/0128242 A1 | 6/2005 | Suzuki |
| 2002/0126673 A1 | 9/2002 | Dagli et al. | 2005/0131876 A1 | 6/2005 | Ahuja et al. |
| 2002/0128903 A1 | 9/2002 | Kernahan | 2005/0132034 A1 | 6/2005 | de la Iglesia et al. |
| 2002/0129140 A1 | 9/2002 | Peled et al. | 2005/0132046 A1 | 6/2005 | de la Iglesia et al. |
| 2002/0159447 A1 | 10/2002 | Carey et al. | 2005/0132079 A1 | 6/2005 | de la Iglesia et al. |
| 2003/0009718 A1 | 1/2003 | Wolfgang et al. | 2005/0132197 A1 | 6/2005 | Medlar |
| 2003/0028493 A1 | 2/2003 | Tajima | 2005/0132198 A1 | 6/2005 | Ahuja et al. |
| 2003/0028774 A1 | 2/2003 | Meka | 2005/0132297 A1 | 6/2005 | Milic-Frayling et al. |
| 2003/0046369 A1 | 3/2003 | Sim et al. | 2005/0138110 A1 | 6/2005 | Redlich et al. |
| 2003/0053420 A1 | 3/2003 | Duckett et al. | 2005/0138242 A1 | 6/2005 | Pope et al. |
| 2003/0055962 A1 | 3/2003 | Freund et al. | 2005/0138279 A1 | 6/2005 | Somasundaram |
| 2003/0065571 A1 | 4/2003 | Dutta | 2005/0149494 A1 | 7/2005 | Lindh et al. |
| 2003/0084300 A1 | 5/2003 | Koike | 2005/0149504 A1 | 7/2005 | Ratnaparkhi |
| 2003/0084318 A1 | 5/2003 | Schertz | 2005/0166066 A1 | 7/2005 | Ahuja et al. |
| 2003/0084326 A1 | 5/2003 | Tarquini | 2005/0177725 A1 | 8/2005 | Lowe et al. |
| 2003/0093678 A1 | 5/2003 | Bowe et al. | 2005/0180341 A1 | 8/2005 | Nelson et al. |
| 2003/0099243 A1 | 5/2003 | Oh et al. | 2005/0182765 A1 | 8/2005 | Liddy |
| 2003/0105716 A1 | 6/2003 | Sutton et al. | 2005/0188218 A1 | 8/2005 | Walmsley et al. |
| 2003/0105739 A1 | 6/2003 | Essafi et al. | 2005/0203940 A1 | 9/2005 | Farrar et al. |
| 2003/0105854 A1 | 6/2003 | Thorsteinsson et al. | 2005/0204129 A1 | 9/2005 | Sudia et al. |
| 2003/0131116 A1 | 7/2003 | Jain et al. | 2005/0228864 A1 | 10/2005 | Robertson |
| 2003/0135612 A1 | 7/2003 | Huntington | 2005/0235153 A1 | 10/2005 | Ikeda |
| 2003/0167392 A1 | 9/2003 | Fransdonk | 2005/0289181 A1 | 12/2005 | Deninger et al. |
| 2003/0185220 A1 | 10/2003 | Valenci | 2006/0005247 A1 | 1/2006 | Zhang et al. |
| 2003/0196081 A1 | 10/2003 | Savarda et al. | 2006/0021045 A1 | 1/2006 | Cook |
| 2003/0204741 A1 | 10/2003 | Schoen et al. | 2006/0021050 A1 | 1/2006 | Cook et al. |
| 2003/0221101 A1 | 11/2003 | Micali | 2006/0037072 A1 | 2/2006 | Rao et al. |
| 2003/0225796 A1 | 12/2003 | Matsubara | 2006/0041560 A1 | 2/2006 | Forman et al. |
| 2003/0225841 A1 | 12/2003 | Song et al. | 2006/0041570 A1 | 2/2006 | Lowe et al. |
| 2003/0231632 A1 | 12/2003 | Haeberlen | 2006/0041760 A1 | 2/2006 | Huang |
| 2003/0233411 A1 | 12/2003 | Parry et al. | 2006/0047675 A1 | 3/2006 | Lowe et al. |
| 2004/0001498 A1 | 1/2004 | Chen et al. | 2006/0075228 A1 | 4/2006 | Black et al. |
| 2004/0010484 A1 | 1/2004 | Foulger et al. | 2006/0080130 A1 | 4/2006 | Choksi |
| 2004/0015579 A1 | 1/2004 | Cooper et al. | 2006/0083180 A1 | 4/2006 | Baba et al. |
| 2004/0036716 A1 | 2/2004 | Jordahl | 2006/0106793 A1 | 5/2006 | Liang |
| 2004/0054779 A1 | 3/2004 | Takeshima et al. | 2006/0106866 A1 | 5/2006 | Green et al. |
| 2004/0059736 A1 | 3/2004 | Willse et al. | 2006/0150249 A1 | 7/2006 | Gassen et al. |
| 2004/0059920 A1 | 3/2004 | Godwin | 2006/0167896 A1 | 7/2006 | Kapur et al. |
| 2004/0071164 A1 | 4/2004 | Baum | 2006/0184532 A1 | 8/2006 | Hamada et al. |
| 2004/0111406 A1 | 6/2004 | Udeshi et al. | 2006/0235811 A1 | 10/2006 | Fairweather |
| 2004/0111678 A1 | 6/2004 | Hara | 2006/0242126 A1 | 10/2006 | Fitzhugh |
| 2004/0114518 A1 | 6/2004 | McFaden et al. | 2006/0242313 A1 | 10/2006 | Le et al. |
| 2004/0117414 A1 | 6/2004 | Braun et al. | 2006/0251109 A1 | 11/2006 | Muller et al. |
| 2004/0120325 A1 | 6/2004 | Ayres | 2006/0253445 A1 | 11/2006 | Huang et al. |
| 2004/0122863 A1 | 6/2004 | Sidman | 2006/0271506 A1 | 11/2006 | Bohannon et al. |
| 2004/0139120 A1 | 7/2004 | Clark et al. | 2006/0272024 A1 | 11/2006 | Huang et al. |
| 2004/0181513 A1 | 9/2004 | Henderson et al. | 2006/0288216 A1 | 12/2006 | Buhler et al. |
| 2004/0181690 A1 | 9/2004 | Rothermel et al. | 2007/0006293 A1 | 1/2007 | Balakrishnan et al. |
| 2004/0194141 A1 | 9/2004 | Sanders | 2007/0011309 A1 | 1/2007 | Brady et al. |
| 2004/0196970 A1 | 10/2004 | Cole | 2007/0028039 A1 | 2/2007 | Gupta et al. |
| 2004/0205457 A1 | 10/2004 | Bent et al. | 2007/0036156 A1 | 2/2007 | Liu et al. |
| 2004/0215612 A1 | 10/2004 | Brody | 2007/0050334 A1 | 3/2007 | Deninger et al. |
| 2004/0220944 A1 | 11/2004 | Behrens et al. | 2007/0050381 A1 | 3/2007 | Hu et al. |
| 2004/0230572 A1 | 11/2004 | Omoigui | 2007/0050467 A1 | 3/2007 | Borrett et al. |
| 2004/0249781 A1 | 12/2004 | Anderson | 2007/0081471 A1 | 4/2007 | Talley et al. |
| 2004/0267753 A1 | 12/2004 | Hoche | 2007/0094394 A1 | 4/2007 | Singh et al. |
| 2005/0004911 A1 | 1/2005 | Goldberg et al. | 2007/0106685 A1 | 5/2007 | Houh et al. |
| 2005/0021715 A1 | 1/2005 | Dugatkin et al. | 2007/0110089 A1 | 5/2007 | Essafi et al. |
| 2005/0021743 A1 | 1/2005 | Fleig et al. | 2007/0112838 A1 | 5/2007 | Bjarnestam et al. |
| 2005/0022114 A1 | 1/2005 | Shanahan et al. | 2007/0116366 A1 | 5/2007 | Deninger et al. |
| 2005/0027881 A1 | 2/2005 | Figueira et al. | 2007/0136599 A1 | 6/2007 | Suga |
| 2005/0033726 A1 | 2/2005 | Wu et al. | 2007/0162609 A1 | 7/2007 | Pope et al. |
| 2005/0033747 A1 | 2/2005 | Wittkotter | 2007/0220607 A1 | 9/2007 | Sprosts et al. |
| 2005/0033803 A1 | 2/2005 | Vleet et al. | 2007/0226504 A1 | 9/2007 | de la Iglesia et al. |
| 2005/0038788 A1 | 2/2005 | Dettinger et al. | 2007/0226510 A1 | 9/2007 | de la Iglesia et al. |
| 2005/0038809 A1 | 2/2005 | Abajian et al. | 2007/0248029 A1 | 10/2007 | Merkey et al. |
| 2005/0044289 A1 | 2/2005 | Hendel et al. | 2007/0271254 A1 | 11/2007 | de la Iglesia et al. |
| 2005/0050205 A1 | 3/2005 | Gordy et al. | 2007/0271371 A1 | 11/2007 | Ahuja et al. |
| 2005/0055327 A1 | 3/2005 | Agrawal et al. | 2007/0271372 A1 | 11/2007 | Deninger et al. |
| 2005/0055399 A1 | 3/2005 | Savchuk | 2007/0280123 A1 | 12/2007 | Atkins et al. |
| 2005/0075103 A1 | 4/2005 | Hikokubo et al. | 2008/0027971 A1 | 1/2008 | Statchuk |
| 2005/0086252 A1 | 4/2005 | Jones et al. | 2008/0028467 A1 | 1/2008 | Kommareddy et al. |
| 2005/0091443 A1 | 4/2005 | Hershkovich et al. | 2008/0091408 A1 | 4/2008 | Roulland et al. |
| 2005/0091532 A1 | 4/2005 | Moghe | 2008/0112411 A1 | 5/2008 | Stafford et al. |
| 2005/0097441 A1 | 5/2005 | Herbach et al. | 2008/0115125 A1 | 5/2008 | Stafford et al. |
| 2005/0108244 A1 | 5/2005 | Riise et al. | 2008/0140657 A1 | 6/2008 | Azvine et al. |
| 2005/0114452 A1 | 5/2005 | Prakash | 2008/0141117 A1 | 6/2008 | King et al. |
| 2005/0120006 A1 | 6/2005 | Nye | 2008/0235163 A1 | 9/2008 | Balasubramanian et al. |
| 2005/0127171 A1 | 6/2005 | Ahuja et al. | 2008/0270462 A1 | 10/2008 | Thomsen |

| | | |
|---|---|---|
| 2009/0070328 A1 | 3/2009 | Loeser et al. |
| 2009/0100055 A1 | 4/2009 | Wang |
| 2009/0178110 A1 | 7/2009 | Higuchi |
| 2009/0187568 A1 | 7/2009 | Morin |
| 2009/0216752 A1 | 8/2009 | Terui et al. |
| 2009/0232391 A1 | 9/2009 | Deninger et al. |
| 2009/0254532 A1 | 10/2009 | Yang et al. |
| 2009/0288164 A1 | 11/2009 | Adelstein et al. |
| 2009/0300709 A1 | 12/2009 | Chen et al. |
| 2009/0326925 A1 | 12/2009 | Crider et al. |
| 2010/0011016 A1 | 1/2010 | Greene |
| 2010/0011410 A1 | 1/2010 | Liu |
| 2010/0037324 A1 | 2/2010 | Grant et al. |
| 2010/0088317 A1 | 4/2010 | Bone et al. |
| 2010/0100551 A1 | 4/2010 | Knauft et al. |
| 2010/0121853 A1 | 5/2010 | de la Iglesia et al. |
| 2010/0174528 A1 | 7/2010 | Oya et al. |
| 2010/0185622 A1 | 7/2010 | Deninger et al. |
| 2010/0191732 A1 | 7/2010 | Lowe et al. |
| 2010/0195909 A1 | 8/2010 | Wasson et al. |
| 2010/0268959 A1 | 10/2010 | Lowe et al. |
| 2010/0332502 A1 | 12/2010 | Carmel et al. |
| 2011/0004599 A1 | 1/2011 | Deninger et al. |
| 2011/0040552 A1 | 2/2011 | Van Guilder et al. |
| 2011/0131199 A1 | 6/2011 | Simon et al. |
| 2011/0149959 A1 | 6/2011 | Liu et al. |
| 2011/0167212 A1 | 7/2011 | Lowe et al. |
| 2011/0167265 A1 | 7/2011 | Ahuja et al. |
| 2011/0196911 A1 | 8/2011 | de la Iglesia et al. |
| 2011/0197284 A1 | 8/2011 | Ahuja et al. |
| 2011/0208861 A1 | 8/2011 | Deninger et al. |
| 2011/0219237 A1 | 9/2011 | Ahuja et al. |
| 2011/0258197 A1 | 10/2011 | de la Iglesia et al. |
| 2011/0276575 A1 | 11/2011 | de la Iglesia et al. |
| 2011/0276709 A1 | 11/2011 | Deninger et al. |
| 2012/0114119 A1 | 5/2012 | Ahuja et al. |
| 2012/0179687 A1 | 7/2012 | Liu |
| 2012/0180137 A1 | 7/2012 | Liu |

OTHER PUBLICATIONS

Microsoft Outlook, Outlook, copyright 1995-2000, 2 pages.
Preneel, Bart, "Cryptographic Hash Functions", Proceedings of the $3^{rd}$ Symposium on State and Progress of Research in Cryptography, 1993, pp. 161-171.
Mao et al. "MOT: Memory Online Tracing of Web Information System," Proceedings of the Second International Conference on Web Information Systems Engineering (WISE '01); pp. 271-277, (IEEE0-0-7695-1393-X/02) Aug. 7, 2002 (7 pages).
Han, OLAP Mining: An Integration of OLAP with Data Mining, Oct. 1997, pp. 1-18.
Niemi, Constructing OLAP Cubes Based on Queries, Nov. 2001, pp. 1-7.
Schultz, Data Mining for Detection of New Malicious Executables, May 2001, pp. 1-13.
Webopedia, definition of "filter", 2002, p. 1.
Werth, T. et al., "Chapter 1—DAG Mining in Procedural Abstraction," Programming Systems Group; Computer Science Department, University of Erlangen-Nuremberg, Germany (cited by Examiner in Sep. 19, 2011 Non-final Rejection).
International Search Report and Written Opinion and Declaration of Non-Establishment of International Search Report for International Application No. PCT/US2011/024902 mailed Aug. 1, 2011 (8 pages).
U.S. Appl. No. 11/254,436, filed Oct. 19, 2005, entitled "Attributes of Captured Objects in a Capture System," Inventor(s) William Deninger et al.
U.S. Appl. No. 11/900,964, filed Sep. 14, 2007, entitled "System and Method for Indexing a Capture System," Inventor(s) Ashok Doddapaneni et al.
U.S. Appl. No. 12/190,536, filed Aug. 12, 2008, entitled "Configuration Management for a Capture/Registration System," Inventor(s) Jitendra B. Gaitonde et al.
U.S. Appl. No. 12/352,720, filed Jan. 13, 2009, entitled "System and Method for Concept Building," Inventor(s) Ratinder Paul Singh Ahuja et al.
U.S. Appl. No. 12/354,688, filed Jan. 15, 2009, entitled "System and Method for Intelligent Term Grouping," Inventor(s) Ratinder Paul Ahuja et al.
U.S. Appl. No. 12/358,399, filed Jan. 23, 2009, entitled "System and Method for Intelligent State Management," Inventor(s) William Deninger et al.
U.S. Appl. No. 12/360,537, filed Jan. 27, 2009, entitled "Database for a Capture System," Inventor(s) Rick Lowe et al.
U.S. Appl. No. 12/410,875, filed Mar. 25, 2009, entitled "System and Method for Data Mining and Security Policy Management," Inventor(s) Ratinder Paul Singh Ahuja et al.
U.S. Appl. No. 12/410,905, filed Mar. 25, 2009, entitled "System and Method for Managing Data and Policies," Inventor(s) Ratinder Paul Singh Ahuja et al.
U.S. Appl. No. 12/690,153, filed Jan. 20, 2010, entitled "Query Generation for a Capture System," Inventor(s) Erik de la Iglesia, et al.
U.S. Appl. No. 12/751,876, filed Mar. 31, 2010, entitled "Attributes of Captured Objects in a Capture System," Inventor(s) William Deninger, et al.
U.S. Appl. No. 12/829,220, filed Jul. 1, 2010, entitled "Verifying Captured Objects Before Presentation," Inventor(s) Rick Lowe, et al.
U.S. Appl. No. 12/873,061, filed Aug. 31, 2010, entitled "Document Registration," Inventor(s) Ratinder Paul Singh Ahuja, et al.
U.S. Appl. No. 12/873,860, filed Sep. 1, 2010, entitled "A System and Method for Word Indexing in a Capture System and Querying Thereof," Inventor(s) William Deninger, et al.
U.S. Appl. No. 12/939,340, filed Nov. 3, 2010, entitled "System and Method for Protecting Specified Data Combinations," Inventor(s) Ratinder Paul Singh Ahuja, et al.
U.S. Appl. No. 13/422,791, filed Mar. 16, 2012, entitled "System and Method for Data Mining and Security Policy Management", Inventor, Weimin Liu.
U.S. Appl. No. 13/424,249, filed Mar. 19, 2012, entitled "System and Method for Data Mining and Security Policy Management", Inventor, Weimin Liu.
U.S. Appl. No. 13/436,275 filed Mar. 30, 2012, entitled "System and Method for Intelligent State Management", Inventors William Deninger, et al.
U.S. Appl. No. 13/024,923, filed Feb. 10, 2011, entitled "High Speed Packet Capture," Inventor(s) Weimin Liu, et al.
U.S. Appl. No. 13/047,068, filed Mar. 14, 2011, entitled "Cryptographic Policy Enforcement," Inventor(s) Ratinder Paul Singh Ahuja, et al.
U.S. Appl. No. 13/049,533, filed Mar. 16, 2011, entitled "File System for a Capture System," Inventor(s) Rick Lowe, et al.
U.S. Appl. No. 13/089,158, filed Apr. 18, 2011, entitled "Attributes of Captured Objects in a Capture System," Inventor(s) Ratinder Paul Singh Ahuja, et al.
U.S. Appl. No. 13/099,516, filed May 3, 2011, entitled "Object Classification in a Capture System," Inventor(s) William Deninger, et al.
U.S. Appl. No. 13/168,739, filed Jun. 24, 2011, entitled "Method and Apparatus for Data Capture and Analysis System," Inventor(s) Erik de la Iglesia, et al.
U.S. Appl. No. 13/187,421, filed Jul. 20, 2011, entitled "Query Generation for a Capture System," Inventor(s) Erik de la Iglesia, et al.
U.S. Appl. No. 13/188,441 filed Jul. 21, 2011, entitled "Locational Tagging in a Capture System," Inventor(s) William Deninger et al.
U.S. Appl. No. 12/967,013, filed Dec. 13, 2010, entitled "Tag Data Structure for Maintaining Relational Data Over Captured Objects," Inventor(s) Erik de la Iglesia, et al.
U.S. Appl. No. 13/337,737, filed Dec. 27, 2011 and entitled "System and Method for Providing Data Protection Workflows in a Network Environment", inventor(s) Ratinder Paul Singh Ahuja, et al.
U.S. Appl. No. 13/338,060, filed Dec. 27, 2011 and entitled "System and Method for Providing Data Protection Workflows in a Network Environment", inventor(s) Ratinder Paul Singh Ahuja, et al.
U.S. Appl. No. 13/338,159, filed Dec. 27, 2011 and entitled "System and Method for Providing Data Protection Workflows in a Network Environment", inventor(s) Ratinder Paul Singh Ahuja, et al.
U.S. Appl. No. 13/338,195, filed Dec. 27, 2011 and entitled "System and Method for Providing Data Protection Workflows in a Network Environment", inventor(s) Ratinder Paul Singh Ahuja, et al.

* cited by examiner

ATTRIBUTES OF CAPTURED OBJECTS IN A CAPTURE SYSTEM

CROSS-REFERENCE TO RELATED APPLICATIONS

This application is a continuation (and claims the benefit of priority under 35 U.S.C. §120) of U.S. patent application Ser. No. 12/751,876, filed on Mar. 31, 2010 now U.S. Pat. No. 8,176,049, entitled "ATTRIBUTES OF CAPTURED OBJECTS IN A CAPTURE SYSTEM," which application is a divisional of U.S. patent application Ser. No. 11/254,436, filed Oct. 19, 2005, now issued as U.S. Pat. No. 7,730,011, entitled "ATTRIBUTES OF CAPTURED OBJECTS IN A CAPTURE SYSTEM". The disclosures of the prior applications are considered part of (and are incorporated herein by reference in their entirety) the disclosure of this application.

FIELD OF THE INVENTION

The present invention relates to computer networks, and in particular, to a capture device.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyze the data leaving the network to monitor for policy violations, and make it possible to track down information leaks. What is needed is a comprehensive system to capture, store, and analyze all data communicated using the enterprises network.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
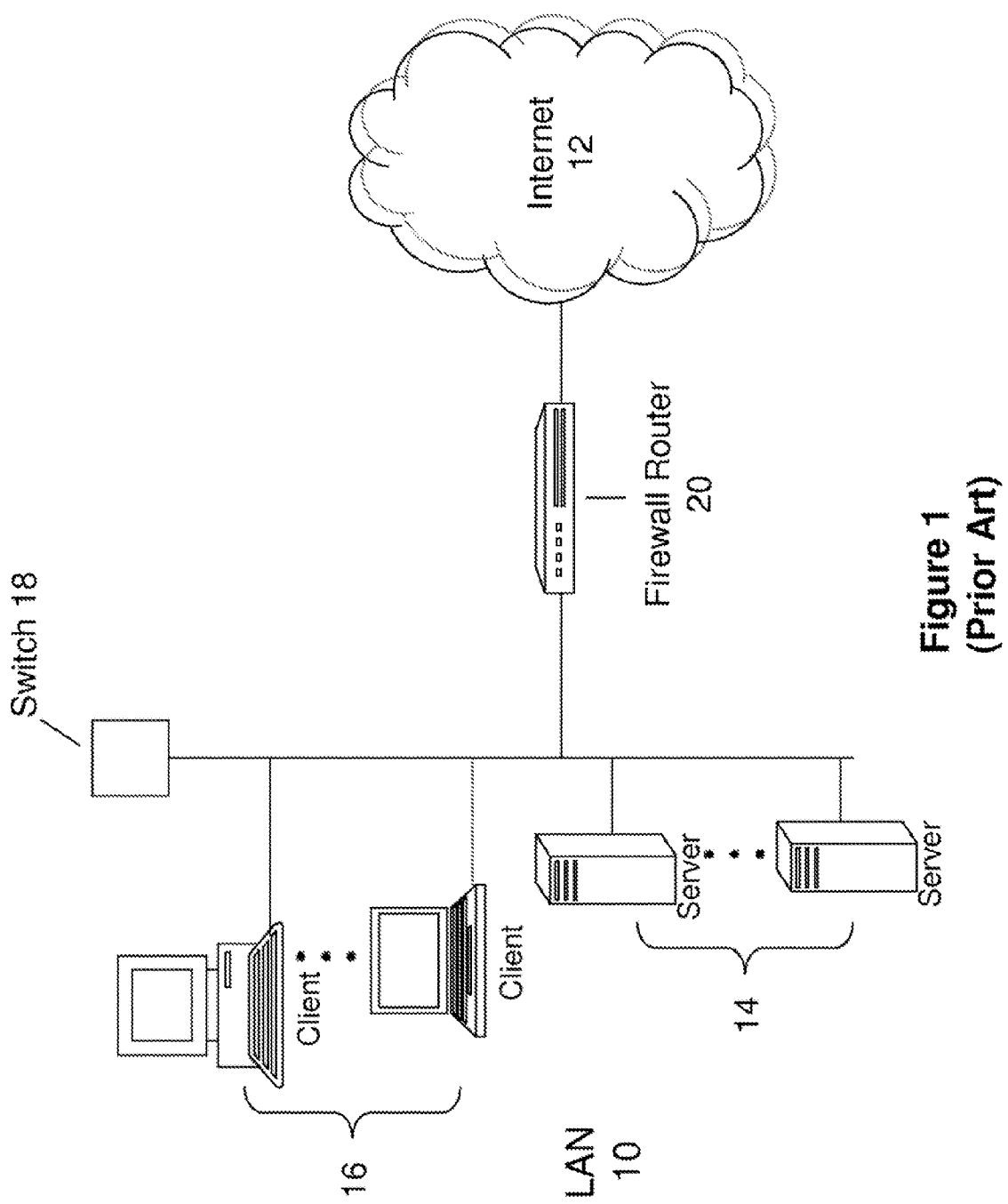
FIG. 1 is a block diagram illustrating a computer network connected to the Internet.

FIG. 1 illustrates a simple prior art configuration of a local area network (LAN) 10 connected to the Internet 12. Connected to the LAN 10 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 20. However, there the router 20 merely forwards packets to the Internet 12. The router 20 cannot capture, analyze, and searchably store the content contained in the forwarded packets.

Figure 2:
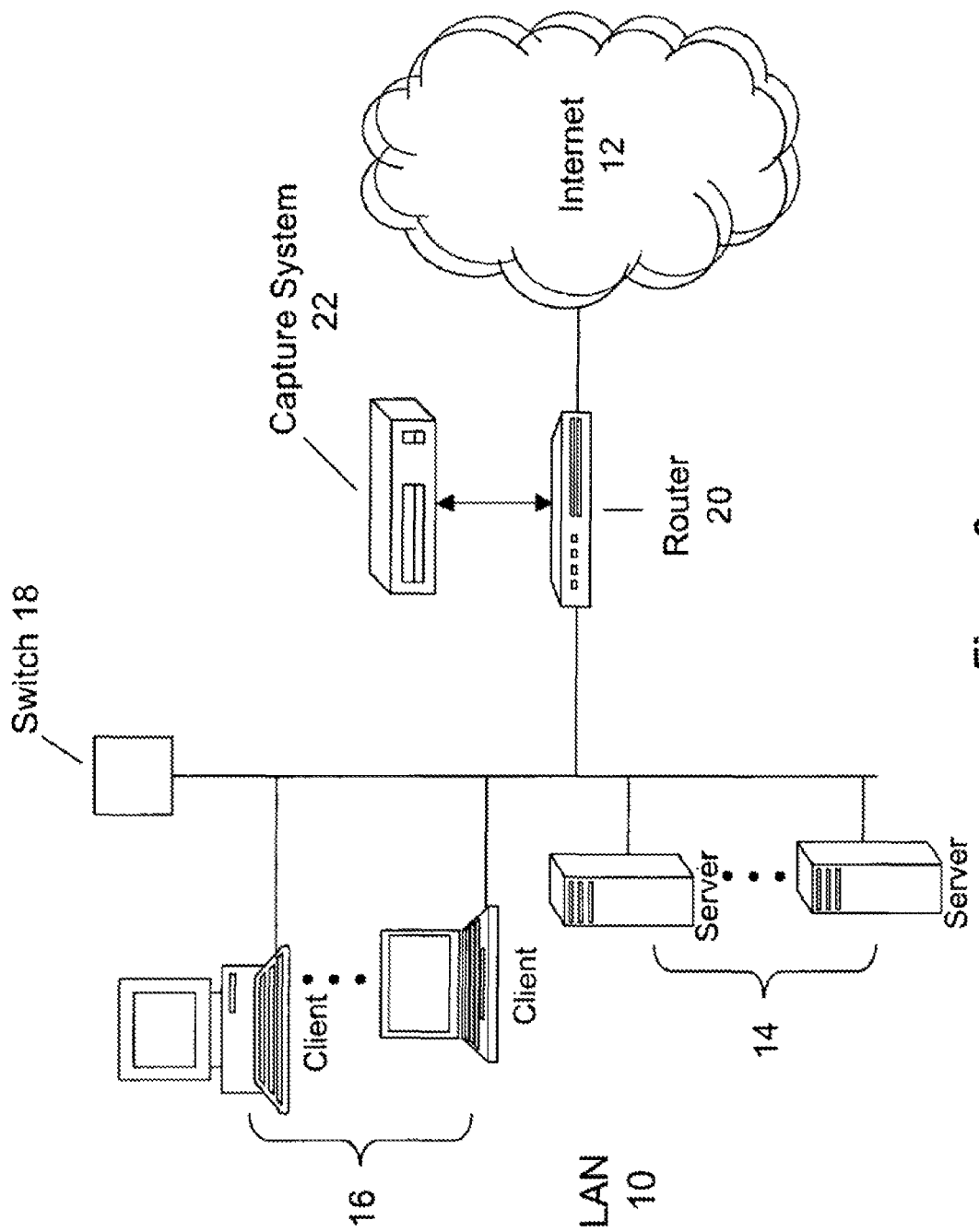
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 20 splits the outgoing data stream, and forwards one copy to the Internet 12 and the other copy to the capture system 22.

There are various other possible configurations. For example, the router 20 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 20 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
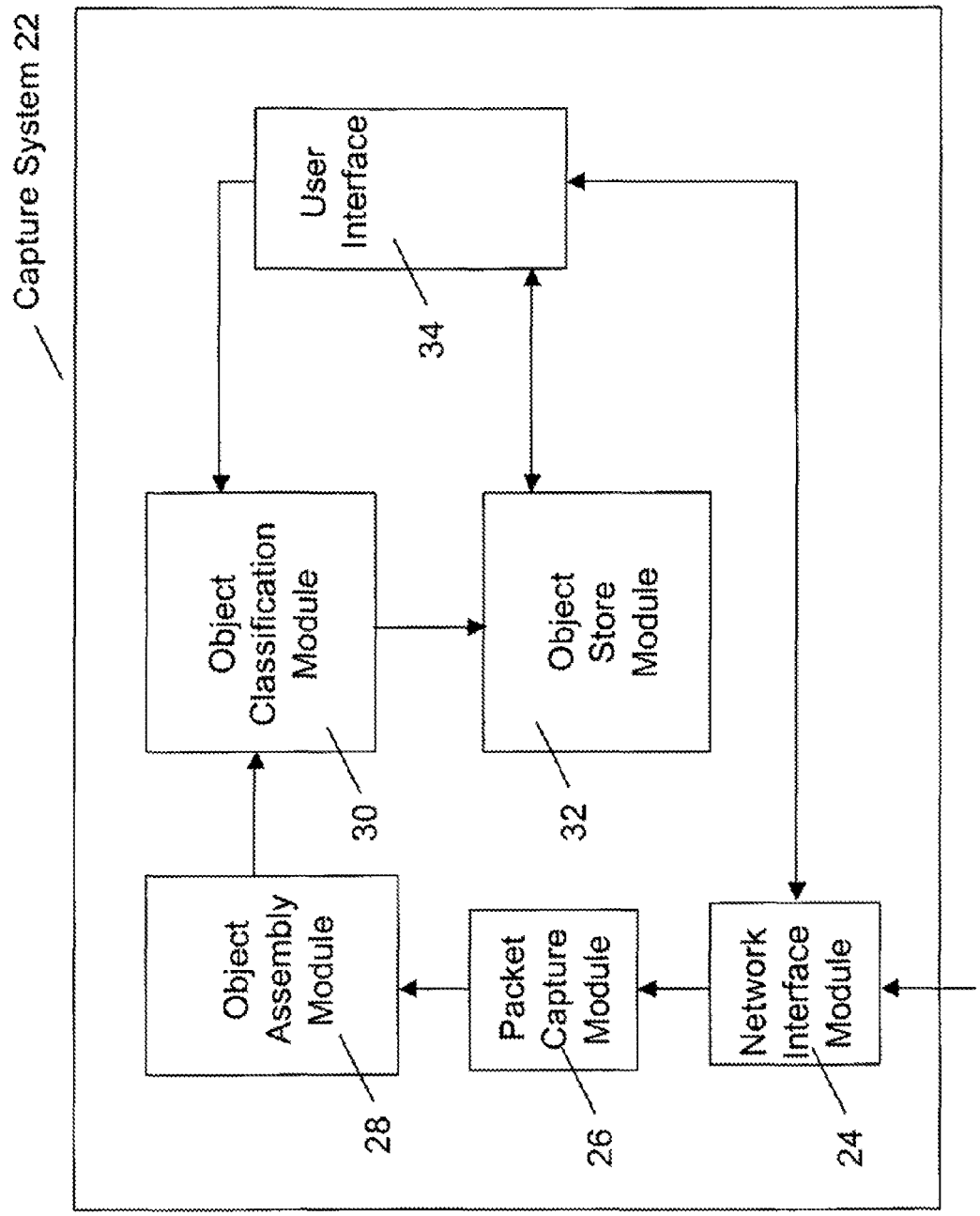
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided to the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
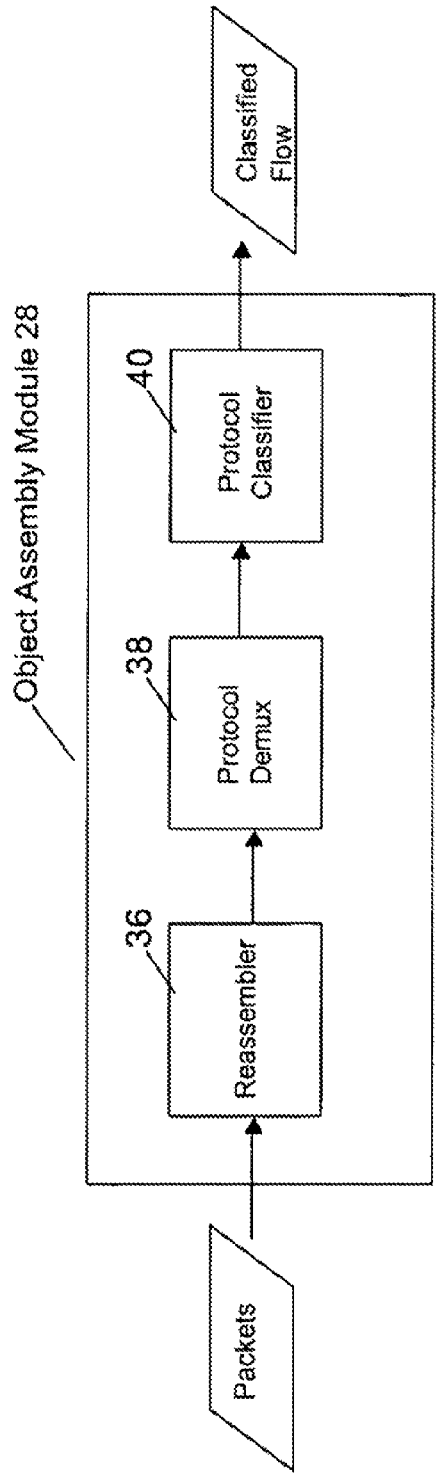
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If no finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the reassembler 36. Thus, in one embodiment, a flow is an ordered data stream of a single communication between a source and a destination.

The flow assembled by the reassembler 36 can then is provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number, which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means. Several embodiments of the object classification module 30 are described in more detail further below.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
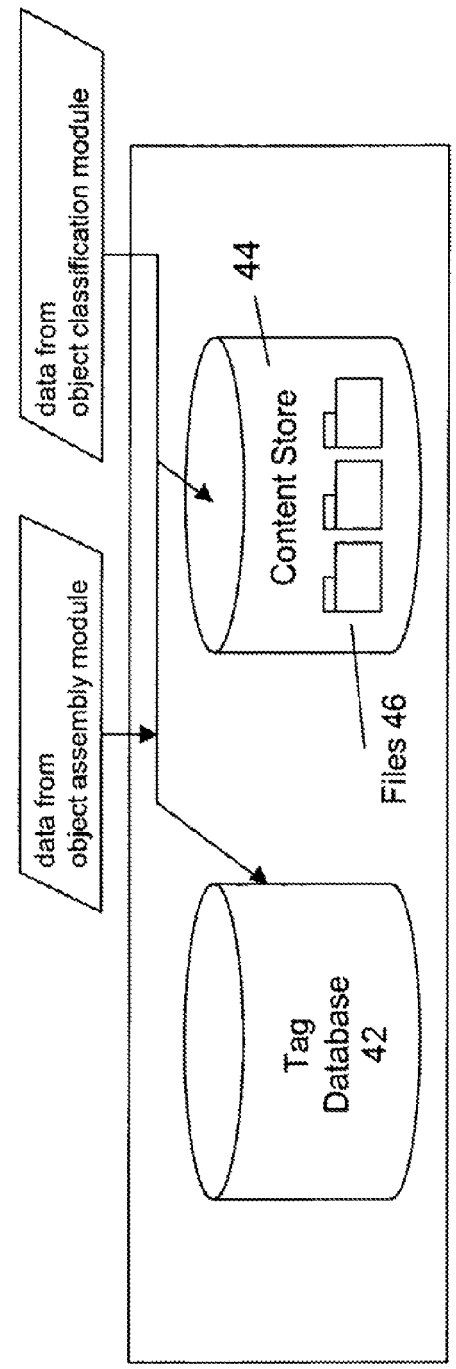
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Attributes

When a user searches over the objects captured by the capture system 22, it is desirable to make the search as fast as possible. One way to speed up searches is to perform searches over the tag database instead of the content store, since the content store will generally be stored on disk and is far more costly both in terms of time and processing power to search then a database.

A user query for a pattern is generally in the form of a regular expression. A regular expression is a string that describes or matches a set of strings, according to certain syntax rules. There are various well-known syntax rules such as the POSIX standard regular expressions and the PERL scripting language regular expressions. Regular expressions are used by many text editors and utilities to search and manipulate bodies of text based on certain patterns. Regular expressions are well-known in the art. For example, according to one syntax (Unix), the regular expression 4\d{15} means the digit "4" followed by any fifteen digits in a row. This user query would return all objects containing such a pattern.

Certain useful search categories cannot be defined well by a single regular expression. As an example, a user may want to query all emails containing a credit card number. Various credit card companies used different numbering patterns and conventions. A card number for each company can be represented by a regular expression. However, the concept of credit card number can be represented by a union of all such regular expressions.

For such categories, the concept of attribute is herein defined. An attribute, in one embodiment, represents a group of one or more regular expressions (or other such patterns). The term "attribute" is merely descriptive, such concept could just as easily be termed "category," "regular expression list," or any other descriptive term.

One embodiment of the present invention is now described with reference to FIG. 7. In the embodiment described with reference to FIG. 7, the attribute tagging functionality is implemented in the object classification module 30 described above. However, the attribute tagging process and modules may be implemented in other parts of the capture system 22 or as a separate module.

Figure 7:
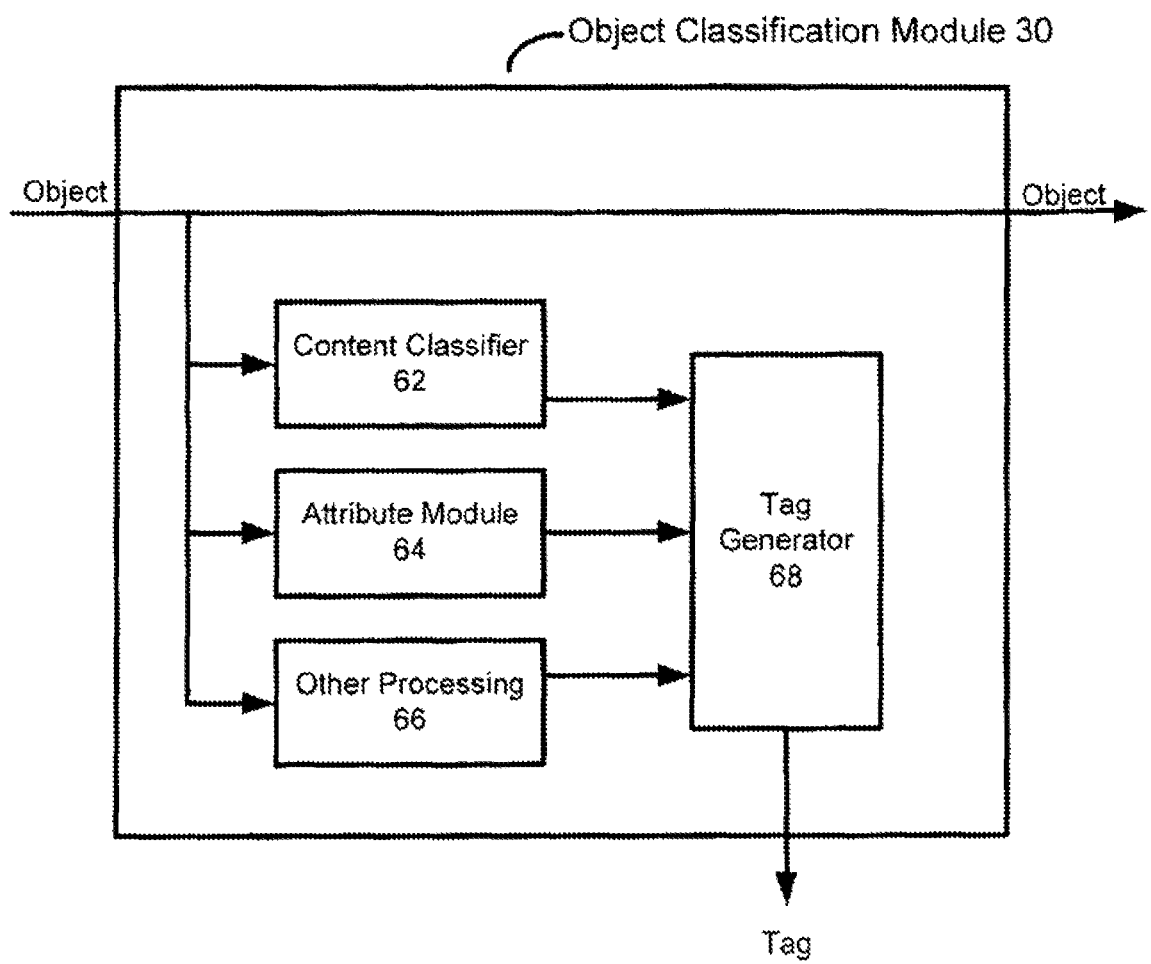
FIG. 7 is a block diagram illustrating an object classification module according to one embodiment of the present invention.

FIG. 7 illustrates a detailed diagram of one embodiment of the object classification module 30. Objects arriving from the object assembly module 28 are forwarded to the content store, and used to generate the tag to be associated with the object. For example, one module called the content classifier 62 can determine the content type of the object. The content type is then forwarded to the tag generator 68 where it is inserted into the content field described above. Various other such processing, such as protocol and size determination, is represented by other processing block 66.

In one embodiment, the attribute module 64 generates an attribute index that can be inserted into an index field of the tag by the tag generator 68. One embodiment of such an index and how it works is now described with reference to FIG. 8.

Figure 8:
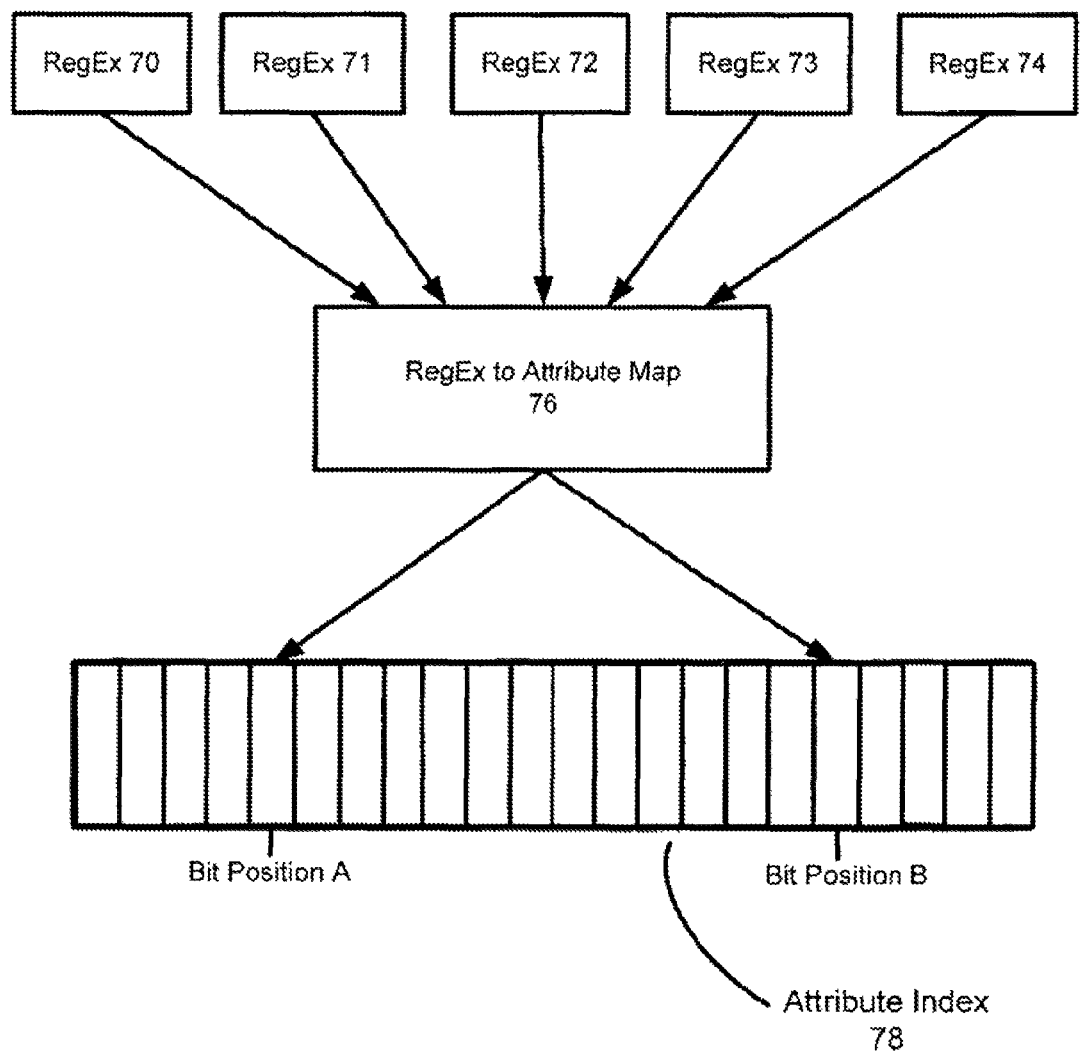
FIG. 8 is a block diagram illustrating bit vector generation according to one embodiment of the present invention.

FIG. 8 shows a plurality of regular expressions (labeled RegEx 70-74). A mapping, such as regular expression to attribute map 76, defines the mapping of the regular expressions to attributes. For example, regular expressions RegEx 70-72 can represent credit card patterns. These regular expressions would map to a credit card number attribute. Regular expressions 73 and 74 may represent phone number patterns and would map to a phone number attribute. A mapping, in this embodiment, of a regular expression to an attribute is thus the reservation and usage of that attribute as implying a successful matching of the regular expression.

In one embodiment, an attribute index 78 is used to represent the attributes in a compact form. In one embodiment, the attribute index 78 is implemented as a bit vector. The attribute index 78 can be a vector of bits with one bit position associated with each defined attribute. For example, in one embodiment, the attribute index 78 has 128 bits. In such an embodiment, 128 separate attributes can be defined and occur independently of one another.

The association of bit positions with attributes can be maintained in a table. Such a table, for this example, would associate bit position A with the credit card number attribute, and bit position B with the phone number attribute. Since, in this example, regular expressions RegEx 70-72 would map to the credit card attribute, observing any one of the patterns defined by RegEx 70-72 would cause bit position A to be set to show the presence of a credit card number in the captured object.

Setting a bit position can be done by changing a bit either from 0 to 1 or from 1 to 0 depending on which one is the default value. In one embodiment, bit positions are initialized as 0 and are set to 1 to show the presence of an attribute. Similarly, since regular expressions 73 and 74 map to the phone number attribute, observing any one of the patterns defined by RegEx 73 and 74 would cause bit position B to be set (e.g., to 1) to show the presence of a phone number in the captured object.

With the above understanding of how one embodiment of the attribute index 78 works, one embodiment of the attribute module 64 is now described with reference to FIG. 9. The input of the attribute module 64, as set forth above, is a captured object captured by the object capture and assembly modules. The object may be a word document, email, spreadsheet, or some other document that includes text or other characters that can represent a pattern expressed as a regular expression.

In one embodiment, the text content contained in the object is first extracted to simplify the attribute tagging processing. The text content of objects includes only textual characters without formatting or application context. In one embodiment, the object or the text extracted from the object is provided to parser 80. The parser 80 parses the object to identify which regular expressions appear in the object.

In one embodiment, the parser accesses a regular expression table 82 that lists all the regular expressions of interest. The parser 80 then can determine which of the regular expressions appear in the object or the text extracted from the object.

In one embodiment, the regular expression table 82 also associates each regular expression contained therein with an attribute. In this manner, the regular expression table 82 can function as the regular expression to attribute map 76 illustrated in FIG. 8. For example, the regular expression table 82 shown in FIG. 9 maps regular expression A to attribute X, regular expressions B and C to attribute Y, and regular expressions D, E, and F to attribute Z.

Since the regular expression table 82 contains the regular expressions and their attribute mapping, the parser 80, by parsing the regular expressions over the object can determine which attributes are present in the object. In one embodiment, the parsing can be made faster by only parsing the regular expressions related to attributes that have not yet been found in the object. For example, if the parser finds a hit from regular expression D in the object, then attribute Z is found in the object. This makes parsing using regular expressions E and F unnecessary, since attribute Z is already hit.

In one embodiment, the parser 80 outputs a list of attributes found in the object. As explained above, an attribute can be a category of patterns such as credit card number, phone numbers, email addresses, bank routing numbers, social security numbers, confidentiality markers, web sites, the names of executive officers of a company, medical conditions or diagnoses, confidential project names or numerical strings indicating salary or compensation information.

In one embodiment, the attributes found in the object are provided to an index generator 84. In one embodiment, the index generator 84 generates the attribute index 78 described with reference to FIG. 8. In one embodiment, the index generator 84 accesses an attribute table 86. The attribute table 86 contains the mapping of attributes to bit positions of the attribute index 78. For example, in FIG. 9, attribute X is mapped to bit position 1, attribute Y is mapped to bit position 2, and attribute Z is mapped to bit position 3.

As an example, if an object contained regular expression A, D, and F, then the parser 80 would first note that attribute X has been hit. When recognizing regular expression D, the parser 80 would note that attribute Z has been hit. Since these are the only attributes in this abbreviated example, the parser 80 would provide attributes X and Z to the index generator 84. According to the attribute table 86, the index generator would set bit positions 1 and 3 of an attribute index 78. Thus, for this simplified example, the attribute index 78 would be "101."

Figure 9:
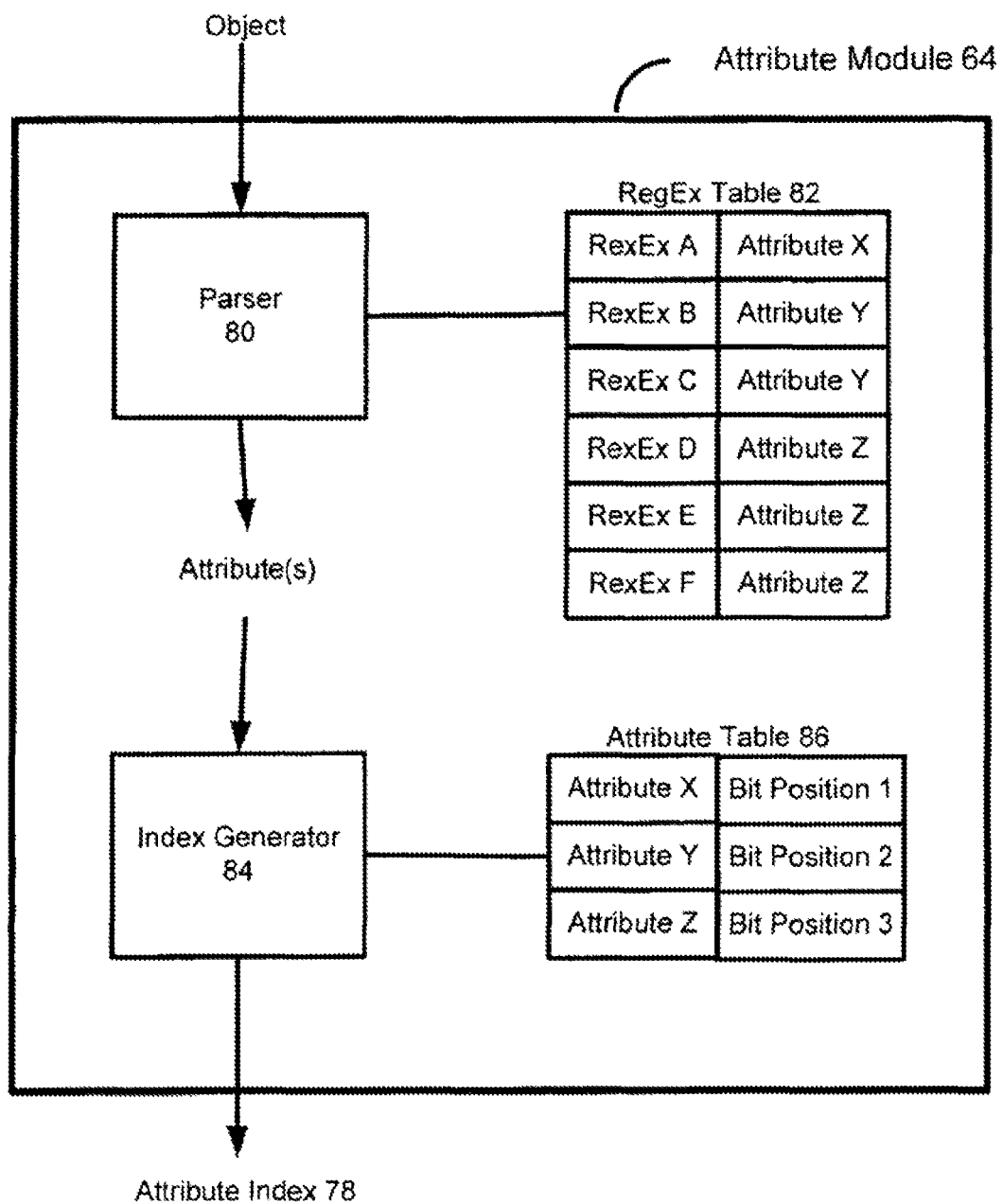
FIG. 9 is a block diagram illustrating an attribute module according to one embodiment of the present invention.

The generation of an attribute index 78 and the use of the specific mapping tables shown in FIG. 9 is just one example of an attribute module 64 performing attribute tagging. In another embodiment, each possible attribute can have a separate field in the tag associated with the object indicating whether the attribute is present in the object. Thus, an attribute index can be thought of as a summary of a plurality of attribute fields. Alternately, each bit position of the attribute index can be thought of as a separate field. Various other implementations and visualizations are also possible.

Figure 10:
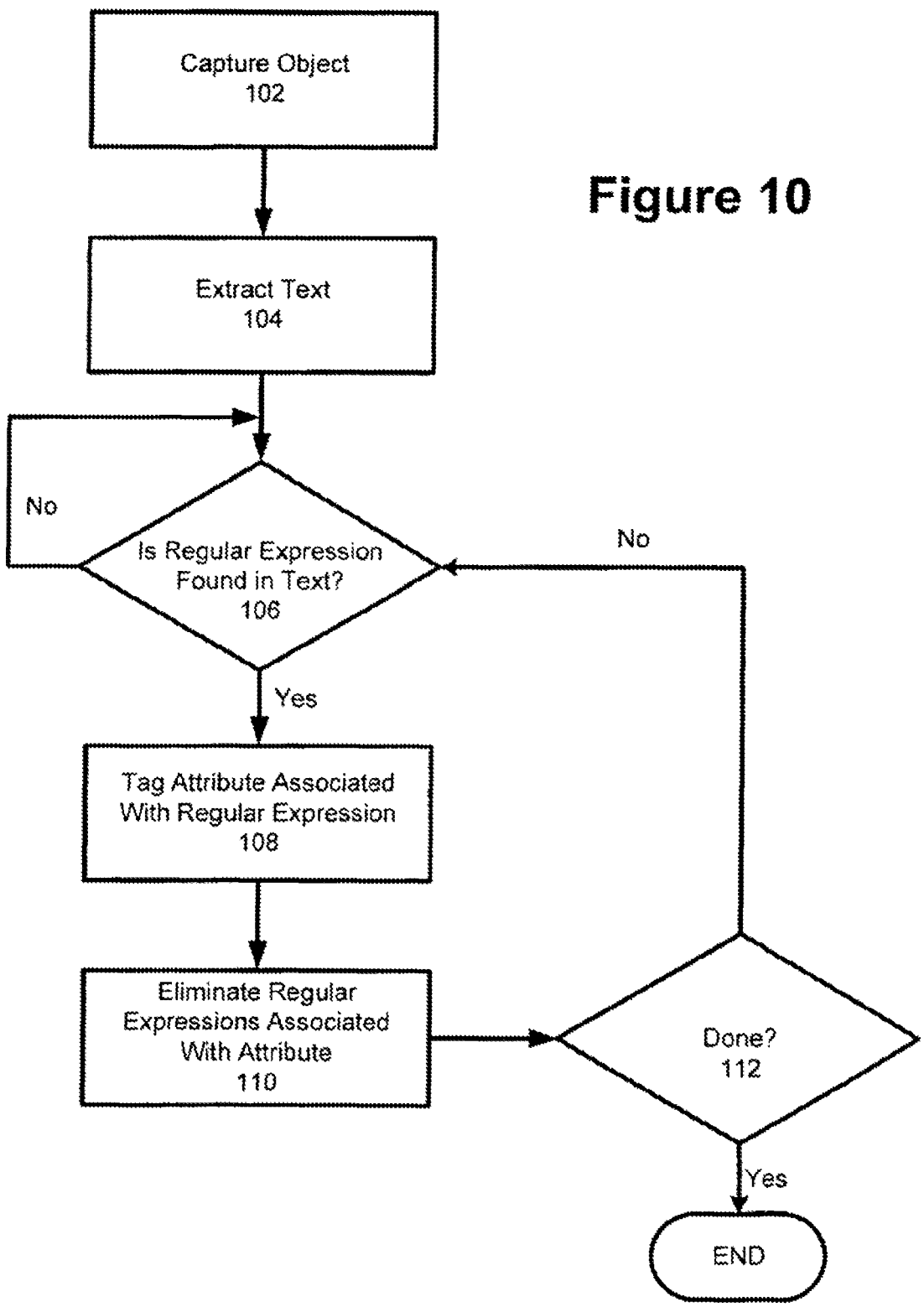
FIG. 10 is a flow diagram illustrating attribute tagging according to one embodiment of the present invention.

One embodiment of attribute tagging is now described with reference to FIG. 10. In block 102, and object is captured. In block 104, the textual content is extracted from the object. In block 106, a determination is made as to whether a regular expression appears in the extracted text.

If the regular expression under consideration does not appear in the text, then, processing continues again at block 106 using the next regular expression on the regular expression list. If, however, the regular expression under consideration does appear in the text, then, in block 108 the attribute associated with the regular expression is tagged. This can be done by setting a field or position in an index in a tag of metadata associated with the object.

In block 110, all other regular expressions associated with the observed attribute are removed from future consideration with respect to the object. In block 112, a determination is made as to whether attribute tagging has completed with respect to the object. If no regular expressions remain to be compared with the extracted text, then the attribute tagging is complete and processing terminates. Otherwise, processing continues at block 106 with the next regular expression on the list under consideration.

Figure 11:
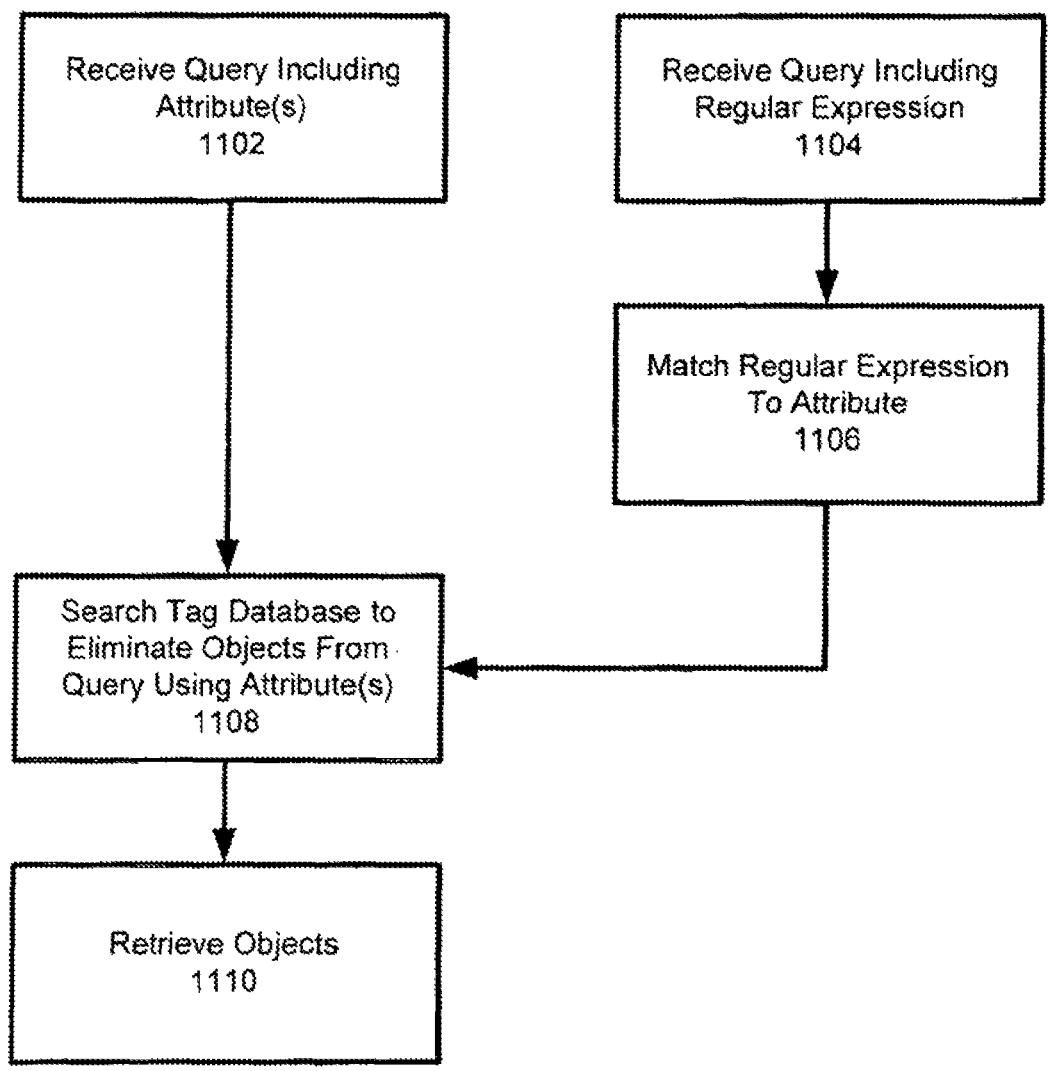
FIG. 11 is a flow diagram illustrating query processing according to one embodiment of the present invention.

Several embodiments of how issuing a query over captured objects is improved by using the attributes described above is now described with reference to FIG. 11. In block 1102, a query is issued. The query can be received by the capture device 22 via user interface 34. The process described with reference to FIG. 10 can be implemented entirely within the user interface, within some query module of the user interface, or a separate query module.

The query—in addition to other limitations, such as content type, size, time range, and so on—can contain one or more attributes the user is looking for. For example, the query could be for all Microsoft Excel documents from last week containing credit card numbers, credit card numbers being an attribute.

In an alternate scenario, the received query only includes one or more regular expressions, as shown in block 1104. In one such embodiment, in block 1106, the regular expression is matched to an attribute, if possible. For example, if the regular expression in the query is only satisfied if another regular expression associated with an attribute is satisfied, then, objects having this attribute tagged are more relevant for this query than objects in general. In particular, any object satisfying the regular expression would also satisfy the attribute. For example, a query for a specific credit card number or range will satisfy the credit card attribute.

Whether provided by the user, or identified based on the query, in block 1108, the appropriate attribute or attributes are used to eliminate objects from the query. In one embodiment, a search is done over the appropriate attribute field or index bit positions in the tags in the tag database. If the attributes being sought are not shown as present in an object, the object is eliminated from further consideration for this query.

In block 1110, the object remaining after elimination are retrieved from the medium they are stored on (such as disk) into memory. They can now be presented to the user as query results, or object can be further eliminated by parsing the retrieved objects for the specific regular expression queried for, where no specific attribute was named.

In one embodiment, the attributes are completely user-configurable. The user interface 34 can provide an attribute editor that allows a user to define attributes by creating attributes and associating a group of regular expressions with the created attribute. The capture device 22 may come preset with a list of common or popular attributes that may be tailored specifically to the industry into which the capture device 22 is sold.

In one embodiment, the capture device 22 can create new attributes automatically. For example, the capture device 22 may observe that a certain regular expression is being searched with some threshold frequency (generally set to be above normal). The capture device 22 may create an attribute to be associated with this regular expression, and begin tagging the newly defined attribute when capturing new objects. In another embodiment, the capture device may suggest that a new attribute be created when a regular expression is searched frequently. In yet another embodiment, the capture device 22 may suggest that an attribute be deleted if infrequently used to make room for another more useful attribute.

General Matters

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
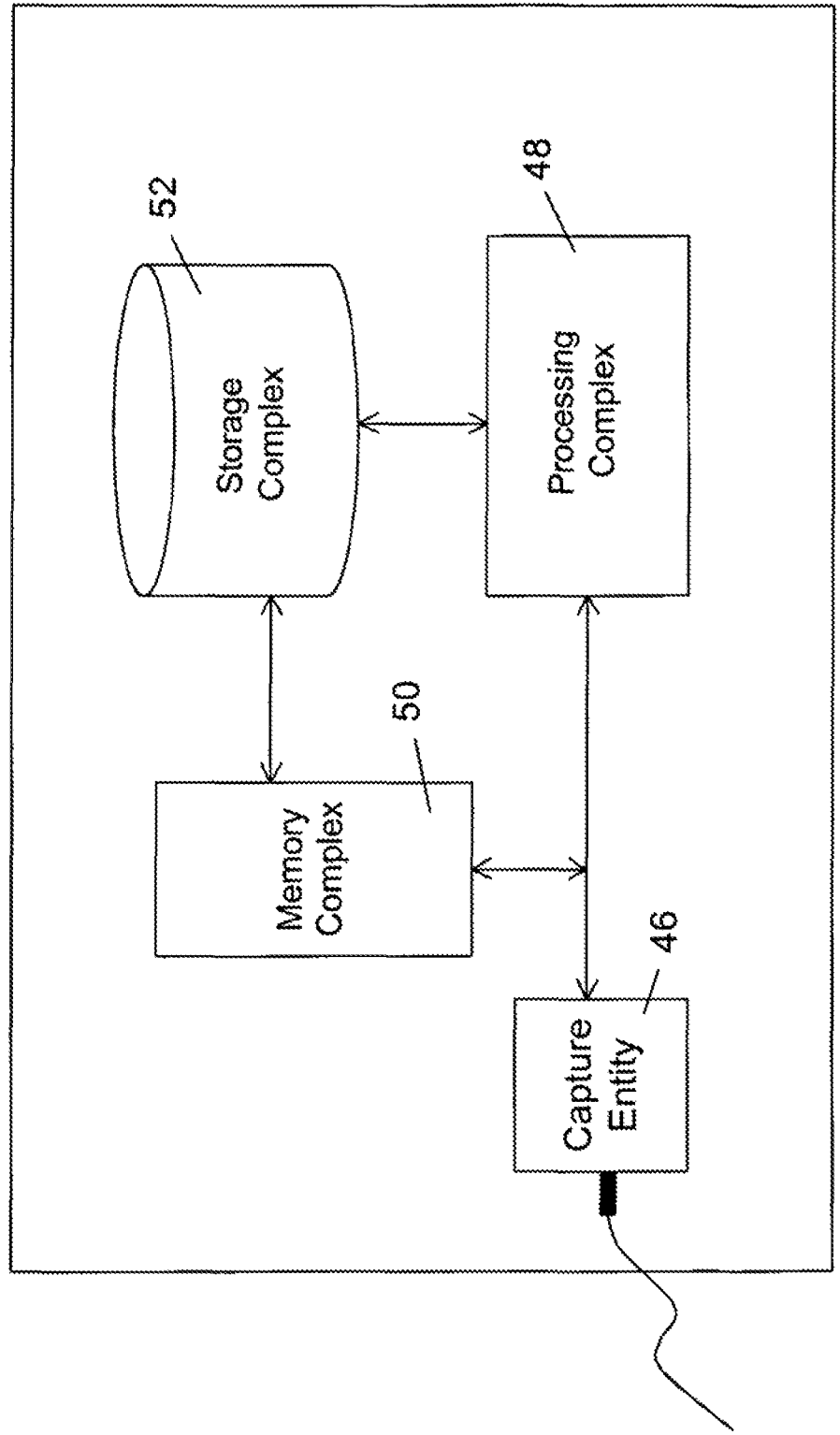
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system and a word indexing scheme for the capture system have been described. In the forgoing description, various specific values were given names, such as "objects," and various specific modules and tables, such as the "attribute module" and "general expression table" have been described. However, these names are merely to describe and illustrate various aspects of the present invention, and in no way limit the scope of the present invention. Furthermore various modules can be implemented as software or hardware modules, or without dividing their functionalities into modules at all. The present invention is not limited to any modular architecture either in software or in hardware, whether described above or not.

The invention claimed is:

1. A method to be executed by a processor in an electronic environment, comprising:
   generating an attribute index for an object in a network environment;
   inserting the attribute index into a tag associated with the object, wherein the attribute index indicates the presence, in the object, of a portion of a set of attributes;
   storing the tag with a plurality of other tags, wherein each tag includes a corresponding attribute index and is associated with a corresponding object;
   receiving a search query comprising search attributes, wherein the search attributes are included in another portion of the set of attributes;
   conducting a first search of the attribute index of each of the stored tags for the search attributes; and
   eliminating a portion of the objects from the first search, wherein the portion of the objects do not include the search attributes.

2. The method of claim 1, wherein the generating the attribute index comprises:
   extracting a text content in the object;
   conducting a second search of the text content for an attribute in the set of attributes;
   setting an index bit corresponding to the attribute in the attribute index if the attribute is found in the text content, wherein the attribute index includes a plurality of index bits corresponding to attributes in the set of attributes; and
   repeating the second search and the setting the index bit for all attributes in the set of attributes.

3. The method of claim 2, wherein each attribute in the set of attributes is associated with one or more distinct regular expressions, and wherein if one of the regular expressions associated with the attribute is found in the text content, eliminating the other regular expressions associated with the attribute from the second search.

4. The method of claim 3, wherein text content is extracted and provided to a parser to identify the regular expressions in the object.

5. The method of claim 4, wherein the parser accesses a regular expression table that includes a list of configured regular expressions of interest for search querying and wherein the regular expression table associates each of the regular expressions it contains with at least one attribute in the set of attributes.

6. The method of claim 2, wherein the index bit corresponding to the attribute is determined from an attribute table containing a mapping of attributes to index bits.

7. The method of claim 1, wherein the object is either a Word document, an e-mail, a spreadsheet, or a PDF having text that can represent a pattern expressed as a regular expression.

8. The method of claim 1, wherein the set of attributes include: a credit card number, a credit card number attribute, a phone number attribute, an email addresses attribute, a bank routing number attribute, a social security number attribute, a confidentiality marker attribute, a web site attribute, an executive officers list attribute, a medical condition attribute, a medical diagnoses attribute, a confidential project name attribute, and a salary or compensation attribute.

9. The method of claim 1, further comprising:
determining a content type of the object; and
inserting the content type into a content field associated with the tag.

10. An apparatus, comprising:
a processor;
a memory for storing data and configured to be accessed by the processor, wherein the memory and the processor co-operate such that the apparatus is configured for:
generating an attribute index for an object in a network environment;
inserting the attribute index into a tag associated with the object, wherein the attribute index indicates the presence, in the object, of a portion of a set of attributes;
storing the tag with a plurality of other tags, wherein each tag includes a corresponding attribute index and is associated with a corresponding object;
receiving a search query comprising search attributes, wherein the search attributes are included in another portion of the set of attributes;
conducting a first search of the attribute index of each of the stored tags for the search attributes; and
eliminating a portion of the objects from the first search, wherein the portion of the objects do not include the search attributes.

11. The apparatus of claim 10, wherein the generating the attribute index comprises:
extracting a text content in the object;
conducting a second search of the text content for an attribute in the set of attributes;
setting an index bit corresponding to the attribute in the attribute index if the attribute is found in the text content, wherein the attribute index includes a plurality of index bits corresponding to attributes in the set of attributes; and
repeating the second search and the setting the index bit for all attributes in the set of attributes.

12. The apparatus of claim 10, wherein the set of attributes include: a credit card number, a credit card number attribute, a phone number attribute, an email addresses attribute, a bank routing number attribute, a social security number attribute, a confidentiality marker attribute, a web site attribute, an executive officers list attribute, a medical condition attribute, a medical diagnoses attribute, a confidential project name attribute, and a salary or compensation attribute.

13. Logic encoded in one or more non-transitory tangible media that includes code for execution and when executed by a processor operable to perform operations comprising:
generating an attribute index for an object in a network environment;
inserting the attribute index into a tag associated with the object, wherein the attribute index indicates the presence, in the object, of a portion of a set of attributes;
storing the tag with a plurality of other tags, wherein each tag includes a corresponding attribute index and is associated with a corresponding object;
receiving a search query comprising search attributes, wherein the search attributes are included in another portion of the set of attributes;
conducting a first search of the attribute index of each of the stored tags for the search attributes; and
eliminating a portion of the objects from the first search, wherein the portion of the objects do not include the search attributes.

14. The logic of claim 13, wherein the generating the attribute index comprises:
extracting a text content in the object;
conducting a second search of the text content for an attribute in the set of attributes;
setting an index bit corresponding to the attribute in the attribute index if the attribute is found in the text content, wherein the attribute index includes a plurality of index bits corresponding to attributes in the set of attributes; and
repeating the second search and the setting the index bit for all attributes in the set of attributes.

15. The logic of claim 14, wherein each attribute in the set of attributes is associated with one or more distinct regular expressions, and wherein if one of the regular expressions associated with the attribute is found in the text content, eliminating the other regular expressions associated with the attribute from the second search.

16. The logic of claim 15, wherein text content is extracted and provided to a parser to identify the regular expressions in the object.

17. The logic of claim 16, wherein the parser accesses a regular expression table that includes a list of configured regular expressions of interest for search querying and wherein the regular expression table associates each of the regular expressions it contains with at least one attribute in the set of attributes.

18. The logic of claim 14, wherein the index bit corresponding to the attribute is determined from an attribute table containing a mapping of attributes to index bits.

19. The logic of claim 13, wherein the object is a Word document, an e-mail, a spreadsheet, or a PDF having text that can represent a pattern expressed as a regular expression.

20. The logic of claim 13, wherein the set of attributes include: a credit card number, a credit card number attribute, a phone number attribute, an email addresses attribute, a bank routing number attribute, a social security number attribute, a confidentiality marker attribute, a web site attribute, an executive officers list attribute, a medical condition attribute, a medical diagnoses attribute, a confidential project name attribute, and a salary or compensation attribute.

* * * * *